United States Patent [19]

Frost et al.

[11] Patent Number: 5,076,842
[45] Date of Patent: Dec. 31, 1991

[54] ARCHITECTURAL LEAD TREATMENT

[75] Inventors: Paul C. Frost, Harefield; Rakesh K. Kochhar, Greenford, both of United Kingdom

[73] Assignee: Cookson Group plc, London, United Kingdom

[21] Appl. No.: 531,642

[22] Filed: Jun. 1, 1990

[30] Foreign Application Priority Data

Jun. 6, 1989 [GB] United Kingdom ................. 8912977

[51] Int. Cl.$^5$ ............................................. C09K 15/02
[52] U.S. Cl. .............................. 106/14.27; 106/14.24; 106/14.25; 106/14.26; 106/14.33; 106/14.35; 106/14.39; 106/14.41; 106/14.44; 427/385.5; 427/388.1; 427/388.5
[58] Field of Search ................ 106/14.12, 14.13, 14.21, 106/14.24, 14.25, 14.26, 14.27, 14.33, 14.35, 14.39, 14.41, 14.44; 427/385.5, 388.1, 388.5

[56] References Cited

U.S. PATENT DOCUMENTS

| 4,405,493 | 9/1983 | Pippard | 106/14.39 |
| 4,462,829 | 7/1984 | Heiss | 106/14.24 |
| 4,687,595 | 8/1987 | Howes et al. | 106/14.05 |

FOREIGN PATENT DOCUMENTS 0096207 12/1983 European Pat. Off. ......... 106/14.13

Primary Examiner—William R. Dixon
Assistant Examiner—Anthony J. Green
Attorney, Agent, or Firm—Watson, Cole, Grindle & Watson

[57] ABSTRACT

A liquid composition for the surface treatment of architectural lead includes at least 10% by weight based on the total weight, of the composition, of an alkyd resin; a solvent for the alkyd resin; and from 1 to 10% by weight, based on the total weight of the composition of a phosphate ester of a phenol ethoxylate in acid or salt form.

10 Claims, No Drawings

ARCHITECTURAL LEAD TREATMENT

BACKGROUND OF THE INVENTION

The present invention relates to a composition and method for the treatment of architectural lead and, in particular, to a composition and method for the surface treatment of architectural lead using a patination oil having a particular formulation.

Traditionally, the appearance of architectural lead ranged from rough sand cast to a smooth but matt dark grey rolled finish, both of which would be fixed by traditional lead working techniques and allowed to weather naturally to a stable patina. During natural weathering, there is an initial stage where basic lead carbonate may be washed from the surface and form a white stain onto any adjacent material. Modern building design is such that run-off may take place from vertical surfaces such as mansards, often without a gutter underneath and directly on to masonry or brickwork. This change in design philosophy has also been accentuated by the advent of lead clad steel and lead coated chipboard. The change in appearance of new lead is also much more marked than in the past, due to the clean, very shiny surface produced by the latest generation of lead rolling mills. The lead sheet can have a brightly coloured surface which is due to interference colours produced by thin oxide films. The difference in appearance between old and new lead, where an old building is being renovated, is thus accentuated.

A patination oil was developed several years ago in response to the run-off from lead sheet staining buildings. This so-called patination oil is, in fact, a coating based on an alkyd resin, a silica flatting agent and other components in a dilute solution in white spirit. It forms a thin film on the surface of the lead which is just permeable enough to allow the slow formation of a stable basic lead carbonate patina underneath it. Over a period of months, it degrades in the sunlight and weathers to leave an even-coloured surface. Problems have been reported due to the silica flatting agent settling out prior to use, to form a thick sticky sludge. Furthermore, the existing formulations of patination oil do not have a significant effect on the oxide films formed on the surface of new lead, but tend to protect the oxide films. This can considerably extend the period during which the colouration discussed above is present. The coloured surface accentuates every imperfection and may lead to an architect rejecting the material, or giving a lower degree of market acceptance for the material.

We have now developed a modified patination oil for architectural lead which removes or modifies the oxide film to eliminate the objectionable colouration and leave a matt surface of a pleasing grey colour.

SUMMARY OF THE INVENTION

Accordingly, in one aspect, the present invention provides a liquid composition for the surface treatment of architectural lead which composition comprises at least 10% by weight, based on the total weight of the composition, of an alkyd resin; a solvent for the alkyd resin and from 1 to 10% by weight, based on the total weight of the composition, of a phosphate ester of a phenol ethoxylate in acid or salt form.

The phosphate ester of a phenol ethoxylate in acid form preferably has the following formula:

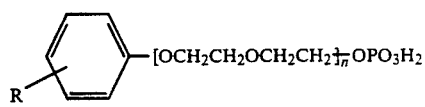

where
R is a $C_1$–$C_6$ alkyl group or a $C_1$–$C_6$ alkoxy group and n is from 1 to 30

The phosphate ester of a phenol ethoxylate in salt form preferably has the following formula:

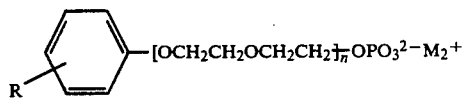

where
R is a $C_{1-6}$ alkyl group or a $C_{1-6}$ alkoxy group, n is from 1 to 30, and
M+ is sodium or potassium.

A suitable phosphate ester of a phenol ethoxylate in acid form is Lakeland PPE604 which is sold by Lakeland Laboratories Limited, whilst a suitable phosphate ester of a phenol ethoxylate in salt form is Lakeland PPE604K which is also sold by Lakeland Laboratories Limited.

The phosphate ester of a phenol ethoxylate in acid or salt form is preferably contained in the composition in an amount of from 4 to 6% by weight based on the total weight of the composition, more preferably in an amount of about 5% by weight.

Alkyd resins are the reaction products of a polybasic acid or an anhydride, and a polyhydric alcohol. For use in coating compositions, alkyd resins usually contain a monobasic fatty acid, for example linseed or soya fatty acids. Modification of alkyd resins is accomplished by the use of other anhydrides, acids, glycerol and also other substances. The most common and useful modifying agents are various natural oils, such as linseed oil. The source of the oil with which the alkyd resin is modified is not critical but the oil content of the alkyd resins used in the present invention is generally above 40% by weight, preferably above 60% by weight, for example in the range of from 65 to 70% by weight. The alkyd resin is used in the present invention in an amount of at least 10% by weight, this percentage referring to the solids content of the alkyd resin.

The liquid composition of the present invention contains a solvent for the alkyd resin, for example white spirit.

The composition may additionally contain therein one or more conventional drying agents. The composition may also contain a silica flatting agent in an amount of up to about 1% by weight of the total composition.

The composition of the present invention may furthermore contain up to about 10% by weight of petroleum naphtha which helps to prevent the alkyd resin from separating from the composition on standing.

The compositions of the present invention are capable of rendering uniform the colour of adjacent areas of architectural lead which otherwise would show interference films of oxides of different hues. The liquid composition of the present invention weathers gradually as the alkyd resin is broken down into smaller molecules. Eventually the composition is converted to a fine dust. During the weathering of the coating the architectural lead gradually develops its natural patina by the formation of a stable basic lead carbonate underneath the coating. Over a longer period of time the basic lead carbonate transforms to normal lead carbonate and then to lead sulphite and lead sulphate.

The present invention also provides a method for the surface treatment of architectural lead, which method comprises coating the surface of the lead with a coating composition of the invention.

The additive used in this method is preferably a phosphate ester of a phenol ethoxylate in acid or salt form, in particular, a phenol ethoxylate in acid or salt form of the type as described above.

However, although the phosphate esters of phenol ethoxylates in acid or salt form are preferred for use in the method of the present invention, the invention is not limited thereto. Accordingly, any additive which will remove or modify any oxide deposit on the surface of the lead may be used. Examples of additives which can be used in the method of the invention thus includes $C_1$-$C_6$ carboxylic acids such as acetic acid; fatty acids such as decanoic and/or dodecanoic acid; fatty acid esters such as methyl or ethyl decanoate, or alkyl phosphates such as acid butyl phosphate.

Whilst the coating composition applied to the surface of the lead is preferably a coating composition based upon an alkyd resin, in particular of the type as described above, other coating compositions may be utilized, such as those which are well known in the art of paint formulation, for example, acrylic, vinylacrylic, poly(vinylacetate), poly(vinylacetal) or poly(urethane) based coating compositions.

The lead surface may be coated either before or after being mounted in its required position.

The present invention will be further described with reference to the following Examples.

EXAMPLE 1

A patination oil according to the present invention was prepared from the following base composition.

| Ingredient | Percent by weight |
| --- | --- |
| Long oil pentaerythritol alkyd resin with a polyester: | |
| soya ratio of 68:32 | 21.09 |
| Silica flatting agent | 0.98 |
| Drying agents | 1.11 |
| Anti-skin solution | 1.95 |
| Petroleum Naphtha (160/180) | 5.00 |
| White Spirit | 69.87 |

To produce the patination oil of the present invention 95% by weight of the above formulation was mixed with 5% of the phosphate ester of a phenol ethoxylate in acid form sold as Lakeland PPE604.

The patination oil so formed was coated evenly onto a panel of architectural lead and the coating allowed to dry under normal atmospheric conditions. This took approximately one hour.

EXAMPLE 2

Patination oil of the unmodified composition was prepared by mixing 337ml of soya-based alkyd resin with 5 g of silica flatting agent, 8 ml of petroleum naphtha with a high-speed mixer for 1 hour. A solution consisting of 0.76 ml of cobalt drier (12%), 4 ml calcium drier (10%), 2.5 ml lead drier (24%), 3 ml of anti-skin agent, 80 ml petroleum naphtha, and 1367 ml of white spirit was then slowly added and stirred for 2 hours.

Half of the above mixture was then combined with 5% by weight of the potassium salt of a phosphated phenol ethoxylate (Lakeland Laboratories PPE 604K). The remaining half was used as a control.

A flat rectangular piece of 99.5% lead-0.05% copper alloy 10 mm.×150 mm. with its surface covered with a conspicuous oxide film of a bright blue to purple colour was coated over a small area with the control mixture, applied with a cotton bud. The surface assumed a dull mauve colouration. An adjacent area was similarly treated with the modified mixture of the present invention. The oxide film was completely removed to reveal a clean metallic surface.

EXAMPLE 3

A replaced lead roof which was free of conspicuous oxide layers, newly installed on a large building, was coated with patination oils in accordance with the invention containing 5% of a phosphate ester of a phenol ethoxylate in acid or salt form, and with an unmodified patination oil. All of the compositions were applied in accordance with the standard application instructions. The lead roof was examined after four months. It was concluded that the areas treated with the formulations containing additions of 5% phosphate esters to the patination oil appeared even in finish and of the desired matt grey colouration, and were almost indistinguishable from the unmodified formulation. A further examination after ten months supported the earlier conclusions.

We claim:

1. A liquid composition for the surface treatment of architectural lead comprising at least 10% by weight, based on the total weight of the composition, of an alkyd resin; a solvent which dissolves the alkyd resin, said solvent being present in an amount up to 80% by weight, based on the total weight of the composition; and from 1 to 10% by weight, based on the total weight of the composition, of a phosphate ester selected from the group consisting of a phosphate ester of a phenol ethoxylate in acid form and a phosphate ester of a phenol ethoxylate in salt form.

2. A liquid composition as claimed in claim 1 wherein the phosphate ester of a phenol ethoxylate in acid form has the formula:

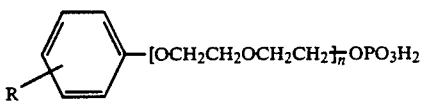

where
R is selected from a $C_1$-$C_6$ alkyl group
and a $C_1$-$C_6$ alkoxy group and n is from 1 to 30

3. A liquid composition as claimed in claim 1 wherein the phosphate ester of a phenol ethoxylate in salt form has the formula:

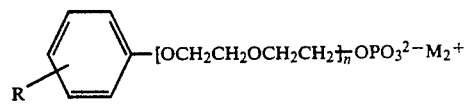

where

R and n are as defined in claim 2 and M+ is sodium or potassium.

4. A liquid composition as claimed in claim 1 wherein the phosphate ester of the phenol ethoxylate is contained in the composition in an amount in the range of from 4 to 6% by weight.

5. A liquid composition as claimed in claim 1 which additionally contains up to about 1% by weight of the total composition of a silica flatting agent.

6. A liquid composition as claimed in claim 1 which includes at least one drying agent therein.

7. A liquid composition as claimed in claim 1 which additionally contains up to about 10% by weight of the total composition of petroleum naphtha.

8. A method for the treatment of the surface of architectural lead, which method consists essentially of coating the surface of the lead with a liquid composition for the surface treatment of architectural lead, said composition comprising at least 10% by weight, based on the total weight of the composition, of an alkyd resin; a solvent for the alkyd resin; and from 1 to 10% by weight, based on the total weight of the composition, of a phosphate ester selected from the group consisting of a phosphate ester of a phenol ethoxylate in acid form and a phosphate ester of the phenol ethosylate in salt form.

9. A method as claimed in claim 8 wherein the lead surface is treated either before being mounted in position on a structure.

10. A method as claimed in claim 8 wherein the lead surface is treated after being mounted in position on a structure.

* * * * *